United States Patent
DeVaul et al.

(10) Patent No.: US 9,828,081 B1
(45) Date of Patent: Nov. 28, 2017

(54) NEGATIVE PRESSURE VESSEL

(71) Applicant: X Development LLC, Mountain View, CA (US)

(72) Inventors: Richard Wayne DeVaul, Mountain View, CA (US); Clifford Biffle, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 155 days.

(21) Appl. No.: 14/227,096

(22) Filed: Mar. 27, 2014

Related U.S. Application Data

(60) Provisional application No. 61/805,761, filed on Mar. 27, 2013.

(51) Int. Cl.
  *B64B 1/06* (2006.01)
  *B64B 1/40* (2006.01)
  *B64B 1/62* (2006.01)

(52) U.S. Cl.
  CPC ............... *B64B 1/06* (2013.01); *B64B 1/40* (2013.01); *B64B 1/62* (2013.01)

(58) Field of Classification Search
  CPC ............... B64B 1/06; B64B 1/62; B64B 1/40
  See application file for complete search history.

(56) References Cited

U.S. PATENT DOCUMENTS

| | | |
|---|---|---|
| 1,390,745 A | 9/1921 | Armstrong |
| 2,682,235 A | 6/1954 | Fuller |
| 4,113,206 A | 9/1978 | Wheeler |
| 4,560,168 A | 12/1985 | Aoyama |
| 5,575,477 A | 11/1996 | Hwang |
| 5,645,248 A | 7/1997 | Campbell |
| 7,770,332 B2 * | 8/2010 | Semiz .................... B64G 1/002 52/2.11 |

FOREIGN PATENT DOCUMENTS

WO  2012/025769  3/2012

OTHER PUBLICATIONS

Smith, et al. "Development and Application of the Elastica Shape for Pressurized Balloons." Japan Society for Aeronautical and Space Sciences, 2002.*

(Continued)

*Primary Examiner* — Philip J Bonzell
*Assistant Examiner* — Michael B Kreiner
(74) *Attorney, Agent, or Firm* — McDonnell Boehnen Hulbert & Berghoff LLP

(57) ABSTRACT

A balloon is provided having an exostructure comprised of hollow struts or rods and an envelope positioned over the exostructure, and a pump for pumping air out of the balloon to create an air pressure differential between the pressure inside the envelope and the atmospheric pressure outside the envelope, a control system configured to allow air to flow into the envelope to control the altitude of the balloon, and to operate the pump to pump air out of the envelope to control the altitude of the balloon, wherein the material of the envelope is arranged so as to sag between the struts or rods and form at least one catenary surface when there is an air pressure differential between the pressure inside of the balloon envelope and the atmospheric pressure outside the envelope.

16 Claims, 8 Drawing Sheets

(56) References Cited

OTHER PUBLICATIONS

Zahavi, et al. "Chapter 1. Basics of Solid Mechanics" from "Nonlinear Problems in Machine Design." CRC Press 2000. pp. 1-48.*
Oñate, et al. (Eds.) "Textile Composites and Inflatable Structures." Springer, 2005.*
Sauer, et al. "A computational formulation for constrained solid and liquid membranes considering isogeometric finite elements." Oct. 17, 2012. Retrieved from: http://arxiv.org/pdf/1210.4791v1.pdf.*
"Mylar Polyester Film." Author unknown. DuPont Teijin Films, Jun. 2003.*
"Carbon, n." OED Online. Oxford University Press, Mar. 2016. Web. Mar. 29, 2016.*
"Tubular, adj. and n." OED Online. Oxford University Press, Mar. 2016. Web. Mar. 29, 2016.*

* cited by examiner

US 9,828,081 B1

NEGATIVE PRESSURE VESSEL

This application claims priority to U.S. Provisional Application 61/805,761, filed Mar. 27, 2013, the contents of which are herein incorporated by reference.

BACKGROUND

Unless otherwise indicated herein, the materials described in this section are not prior art to the claims in this application and are not admitted to be prior art by inclusion in this section.

The use of high altitude balloons may be used for a variety of purposes. For example, high altitude balloons have been used as weather balloons, and may be used to monitor atmospheric conditions. High altitude balloons have utilized lighter-than-air gases such as helium or hydrogen to provide an upward lifting force. Over time, the lighter than air gas may dissipate, reducing the upward lifting force which may eventually lead to an insufficient lifting force to keep the balloon aloft. Accordingly, it is desirable to provide another way to keep a high altitude balloon aloft that may be used as an alternative to, or in combination with, the use of a lighter-than-air gas such as helium or hydrogen.

SUMMARY

In one aspect, a balloon is provided having an exostructure comprised of hollow struts or rods and an envelope positioned over the exostructure, and a pump for pumping air out of the balloon to create a pressure differential between the air pressure inside the envelope and the atmospheric pressure outside the envelope, a control system configured to allow air to flow into the envelope to control the altitude of the balloon, and to operate the pump to pump air out of the envelope to control the altitude of the balloon, wherein the material of the envelope is arranged so as to sag between the struts or rods and form at least one catenary surface when there is an pressure differential between the pressure inside of the envelope and the atmospheric pressure outside the envelope.

In another aspect, a vessel is provided comprising a plurality of balloons attached to or positioned within the vessel, wherein the plurality of balloons are each comprised of an exostructure comprised of hollow struts or rods and an envelope positioned over the exostructure, and a pump for pumping air out of the balloon envelope to create an air pressure differential between the pressure inside the envelope and the atmospheric pressure outside the envelope, wherein air may pumped out of the balloon envelope, or introduced into the balloon envelope, to control the altitude of the vessel.

In another aspect, a computer-implemented method is provided, comprising the steps of controlling the altitude of a negative pressure vessel, wherein the negative pressure vessel is comprised of an exostructure comprised of hollow struts or rods and an envelope positioned over the exostructure, wherein the material of the envelope is arranged so as to sag between the struts or rods and form at least one catenary surface when there is an air pressure differential between the pressure inside of the envelope and the atmospheric pressure outside the envelope, pumping air out of the envelope to increase an air pressure differential between the pressure within the envelope and the atmospheric pressure outside the envelope to provide a more buoyant upward force and increase the altitude of the negative pressure vessel, and pumping or letting air into the envelope to decrease the air pressure differential between the pressure within the envelope and the atmospheric pressure outside the envelope to provide a less buoyant upward force and decrease the altitude of the negative pressure vessel.

In another aspect, a non-transitory computer readable medium has stored therein instructions that are executable by a computing device to cause the computing device to perform functions comprising controlling the altitude of a negative pressure vessel, wherein the negative pressure vessel is comprised of an exostructure comprised of hollow struts or rods and an envelope positioned over the exostructure, wherein the material of the envelope is arranged so as to sag between the struts or rods and form at least one catenary surface when there is an air pressure differential between the pressure inside of the envelope and the atmospheric pressure outside the envelope, pumping air out of the envelope to increase an air pressure differential between the pressure within the envelope and the atmospheric pressure outside the envelope to provide a more buoyant upward force and increase the altitude of the negative pressure vessel, and pumping or letting air into the envelope to decrease the air pressure differential between the pressure within the envelope and the atmospheric pressure outside the envelope to provide a less buoyant upward force and decrease the altitude of the negative pressure vessel.

These as well as other aspects, advantages, and alternatives, will become apparent to those of ordinary skill in the art by reading the following detailed description, with reference where appropriate to the accompanying drawings.

DETAILED DESCRIPTION

Figure 1:
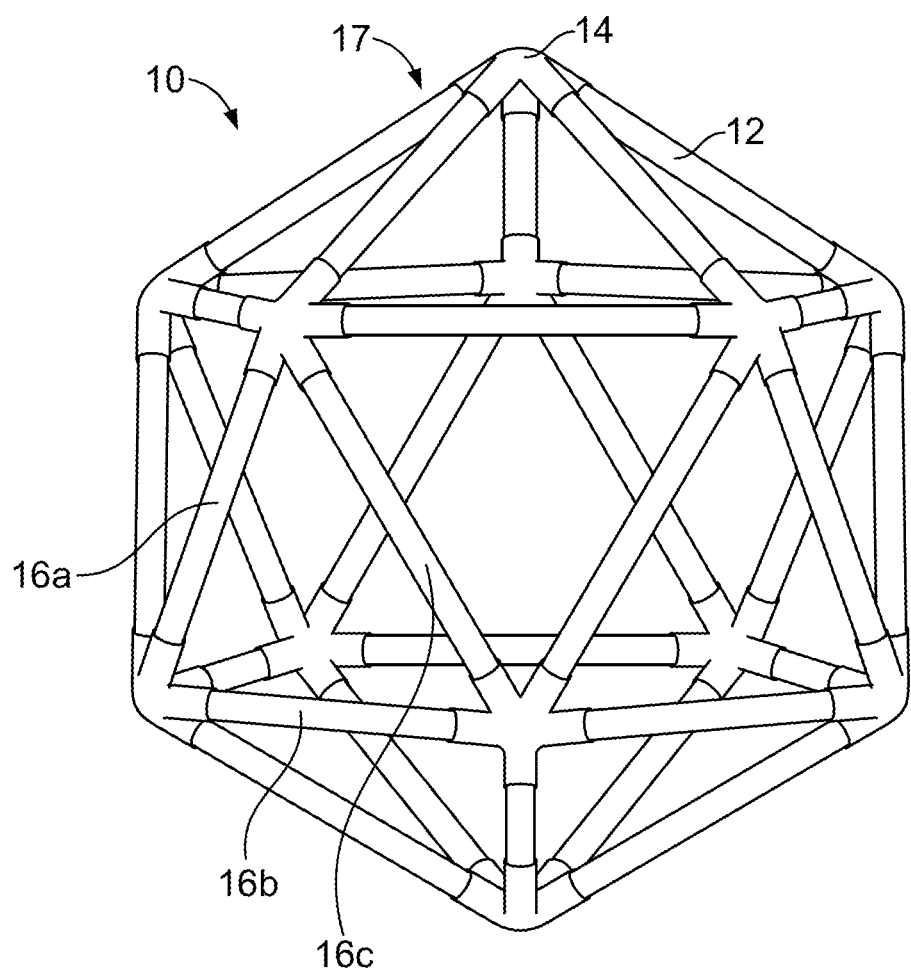
FIG. 1 shows the exostructure of a negative pressure vessel, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

There are a number of different ways in which the altitude of a balloon may be controlled. For example, the use of lighter-than-air gas within the balloon envelope may be used to control the altitude of a balloon. Thus, helium or hydrogen gas has been used to provide lifting force to a balloon. With such lighter-than-air gases, the altitude of a balloon may be controlled by pumping more or less helium or hydrogen into the envelope of the balloon, or into a bladder within the envelope of the balloon, to increase or decrease the buoyancy of the balloon.

The use of lighter-than-air gas such as helium or hydrogen may present environmental concerns, or concerns regarding the use of scarce resources. In addition, the balloon may have only a finite supply of lighter-than-air gas, which once depleted, cannot be used to control the altitude of the balloon. Therefore, other methods to control the altitude of the balloon may be desirable. In particular, it may be desirable to provide a balloon that does not require the use of (although may also use) a lighter-than-air gas such as helium or hydrogen to provide lifting force and that may be used to control the altitude of the balloon.

It is possible for a vessel, such as a balloon envelope, to be evacuated of air, thus making the vessel lighter than the surrounding air and buoyant. Thus, it may be possible to create a vacuum, or partial vacuum, within a balloon envelope, also known as a negative pressure vessel, by evacuating air from within the balloon envelope to obtain a balloon that is lighter than the surrounding air and that has a buoyant lifting force. Thus, it is conceivable that the altitude of a balloon may be controlled by changing the vacuum level within the balloon envelope, and thus changing the pressure differential between the air pressure within the balloon envelope (if any) and the surrounding air pressure.

When considering altitudinal control via vacuum level adjustments, the force of the atmosphere acting on an evacuated vessel (e.g., on the negative pressure vessel) should be taken into account. The force of atmospheric pressure acting on an evacuated vessel is significant. For example, it has been reported that 30 horses, in two teams of 15 pulling in opposite directions could not separate two copper hemispheres (known as the Magdeburg hemispheres) that had been evacuated of air because the atmospheric pressure pressing the two hemispheres together was too great. Consequently, designing a negative pressure balloon that uses a vacuum, or pressure differential, to control the altitude of the balloon presents a great challenge.

It is desirable that the structure of the balloon be designed to withstand the forces resulting from the pressure differential between the low pressure inside of the balloon and the atmospheric pressure outside of the balloon. Furthermore, not only is it desirable for the structure of the balloon to be strong enough to withstand the atmospheric pressure, it is also desirable for the structure of the balloon to be light enough so that the overall weight of the balloon and gas within is lighter than the surrounding air to provide a sufficient lifting force to control the altitude of the balloon.

Example embodiments may be directed to a negative pressure vessel, which is sometimes referred to as a "void ship." The negative pressure vessel may include a rigid internal structure, or exostructure, and an exterior covering or "skin." To provide for the desired strength, the exostructure may include light, but strong struts or rods, having a tessellated geometry such as a geodesic dome, or the structure of a "Buckyball." Thus, the exostructure may be essentially a rigid sphere formed of interconnected struts or rods. In one embodiment, the exostructure may include an icosahedron, or regular polyhedron with 20 identical equilateral triangular faces, with five faces meeting at each vertex. The exostructure may also include or take the form of a multi-frequency icosahedron such as 3-, 6-, or 9-frequency icosahedron.

The exostructure may be formed by a plurality of interlocking triangles to form an aggregation of trusses. Alternately, the exostructure may be a tessellated structure using honeycomb structures. As noted above, when the negative pressure vessel is evacuated, the exostructure will need to withstand substantial forces from the atmospheric pressure. Thus, the struts or rods may be designed to withstand compressive forces and have stability against buckling under the pressure. For example, the struts or rods may take the form of pultruded carbon fiber tubes having sufficient dimensions in terms of length, and internal and external diameter, and Young's modulus to withstand the atmospheric pressure. The rods may be thick in terms of their external diameters, with a thin wall, and have a short length. The overall diameter of the exostructure may be on the order of one meter, and possibly two meters, as the volume of the spherically-shaped exostructure increases with a cube of its radius (Volume=$4/3\pi r^3$). If the diameter is too small, the buoyant force may be insufficient to lift the weight of the vessel, and if the diameter is too large, the exostructure may not be able to support the pressure differential. An exostructure on the order one meter in diameter provides a good balance of weight and strength.

The pultruded carbon fiber tubes are preferably hollow, thin-walled tubes, with walls as thin as can be reliably manufactured so as to reduce the weight but maintain sufficient stability against buckling. The tubes should have an outer diameter wide enough to resist buckling, for example a diameter of several centimeters, and may have a length on the order of 10 centimeters. Carbon fiber tubes provide good compressive strength. Also, the geometry of the exostructure may be in the form of a second level tessellation. The carbon fiber tubes may be joined together using a joint structure that the ends of the carbon fiber tubes are slotted into, to help eliminate any stress concentrations that may be formed in the exostructure. Using this structure, it is contemplated that a 50 kilopascal (kPa) pressure differential between the inside of the negative pressure vessel and the atmosphere may be achieved. Thus, the internal pressure of the negative pressure vessel may be pumped down to a half an atmosphere pressure differential at a desired altitude to provide a desired buoyancy of the vessel.

In an example embodiment, a negative pressure vessel may include an exostructure that is designed to withstand atmospheric pressure, while at the same time being light enough to provide the desired buoyant force when air is evacuated from the vessel. The envelope or skin of the balloon may be positioned over the exostructure, although in some instances it could be positioned inside of the exostructure. However, given the pressure differential, the envelope or skin may be advantageously placed over the exostructure, such that the exostructure provides support against the force of atmospheric pressure.

A typical balloon may include an envelope that consists of a single contiguous material. However, when a single contiguous material used with a typical balloon envelope is stretched over a negative pressure vessel, stress concentrations may form at the intersections of the struts or rods used in the exostructure. Stretching a continuous piece of an envelope over the exostructure may place undue stress on the envelope as the negative pressure within the vessel tries to "suck" the portions of the envelope between the struts or rods toward the center of the exostructure, because there is not enough material to allow the envelope material to sag between the struts or rods of the exostructure. As a result, it is desirable to provide additional envelope material between each of the struts or rods. Such additional material allows the envelope to sag between the struts or rods resulting in reduced stress concentrations on the envelope and providing for greater envelope strength. In some embodiments, the material may take the shape of a catenary surface, in three dimensions, that advantageously provides even greater distribution of stress and force across the envelope. A catenary shaped surface is similar to, but different than, a parabolic surface (which could also be used), but provides a desired distribution of stress and force across the envelope. The desired catenary shaped surface of the envelope material between the struts or rods allows the envelope material to sag like a suspension bridge, as opposed to having the envelope material flat between the struts or rods of the exostructure.

To form a catenary surface between the struts or rods, an envelope material in an amount greater in size than the tessellated structures may be used for each such structure. Therefore, if the exostructure includes triangular tessellations, then a circular, or generally rounded envelope portion could be used for each triangle such that the material sags between the struts or rods that make up the triangle and forms a catenary surface. Once the envelope material is positioned in a desired sagging, or catenary-shaped position between the struts or rods of the tessellated structures of the exostructure, it may be joined to or connected to an adjacent piece of envelope material. The different portions of envelope material may be joined together in an essentially air-tight manner (to hold the vacuum) using conventional techniques. For example, if the envelope material is MYLAR™ a thermoplastic film, then the adjacent pieces of envelope material can be heat sealed together or a suitable adhesive may be used.

It should be further noted that the strength of the envelope material, including MYLAR™ a thermoplastic film, may increase if the material is stretched, and stress concentrations may be reduced if the material is heated. Therefore, it may be desirable to stretch, heat or anneal, and then heat seal the material together (or some combination thereof) as it is applied to the struts or rods of the exostructure, to impart even additional strength to the envelope and reduce stress concentrations from the envelope.

The atmospheric pressure at sea level is greater than at altitude. For example, at sea level the standard atmospheric pressure is about 100 kPA, and decreases on the order of 4% every 1000 feet of altitude. Thus, at sea level (and ground level) the negative pressure vessel will experience greater atmospheric pressure than when the vessel is operating at a desired altitude. As a result, in some applications it may be desirable to use a lighter-than-air gas with the negative pressure vessel to raise the negative pressure vessel to a desired altitude, perhaps at balloon launch. As the altitude of the vessel increases, the lifting gas (such as helium) may be pumped out of the balloon envelope, or out of a bladder within the balloon envelope. Once, the negative pressure vessel attains a desired altitude, the lifting gas may no longer be needed for purposes of altitude control.

When a lifting gas such as helium is used, the entire balloon envelope could initially be filled with helium and used to bring the negative pressure vessel to a desired altitude. As the vessel ascends, the helium may be pumped out of the balloon envelope and eventually the helium will dissipate and the altitude of the balloon may be controlled solely varying the pressure differential between the pressure of gas within the balloon envelope and the atmospheric pressure outside the balloon envelope. Alternatively, when a lifting gas such as helium is used, the helium could be stored in a bladder within the balloon envelope, and pumped out of the bladder as the balloon ascends to a desired altitude.

In any event, an absolute vacuum, or near vacuum within the balloon envelope may not be required, and the use of lifting gas at launch may be used so that the negative pressure vessel does not have to withstand full atmospheric pressure at sea level. Thus, as an example, a 50 kPa pressure differential between the air pressure within the balloon and the atmospheric pressure outside the balloon may be used at launch, and may be sufficient to control the altitude of the balloon at a desired altitude in the absence of lifting gas.

Alternatively, the negative pressure vessel may be attached to or placed within another balloon or vessel that may be filled with a lifting gas such as helium to have the balloon ascend to a desired altitude at which point the negative pressure vessel could be released from the balloon and operate on its own. At this point, the altitude of the negative pressure vessel may be controlled by pumping air out of the balloon envelope to control the pressure differential. In this example, no lifting gas is required to be used within the negative pressure vessel.

At a desired altitude, therefore, the altitude of the balloon may be controlled by pumping air into or out of the balloon envelope to control the pressure differential between the air pressure within the balloon and the atmospheric pressure outside the balloon. Thus, if it is desired to increase the altitude of the balloon, more air may be pumped out of the balloon envelope to increase the pressure differential and provide a more buoyant upward force. Conversely, if it is desired to decrease the altitude of the balloon, air may be let into (or pumped into) the balloon envelope to decrease the pressure differential and provide a less buoyant upward force.

The negative pressure vessel may be equipped with a light weight vacuum pump suitable to pump air out of the balloon envelope to increase the pressure differential. The pump may be operated to pump air out of the balloon envelope as desired to control the altitude of the negative pressure vessel. A valve, such as a one-way valve, could also be operated to allow air to bleed into the balloon envelope to decrease the pressure differential and allow the balloon to descend. Alternately, a pump could be used to pump air into, or out of, the balloon envelope as desired. A multi-stage pumping approach may be used where a ground based pump, such as a radial or turbine pump may be used to pump out a relatively large volume of air to initially reduce the pressure within the balloon envelope. At low back pressures, such pumps have a tendency to stall out. Therefore, once a relatively low internal pressure is achieved, a reciprocating vacuum pump may be used to pump down the interior of the balloon envelope into even lower pressures. A reciprocating vacuum pump could remain with the balloon during its flight and be used to maintain a desired internal pressure.

Energy is needed to operate a pump that may be used to pump air out of the balloon envelope. Accordingly, a payload attached to the balloon may include one or more solar cells to store energy that can be used for altitude control. In addition, or alternately, the surface of the balloon envelope could also be equipped with solar cells to absorb and store energy from sunlight. Therefore, solar energy stored during the day may be used to power a pump to control the altitude of the balloon by pumping gas into, or out of, the envelope of the balloon.

In some balloons, the buoyancy, and thus the altitude, of the balloon may be controlled by adjusting the temperature of the gas within an envelope of the balloon. Under proper circumstances, the altitude of balloon may be controlled by increasing or decreasing the temperature of the gas within the envelope. Controlling the temperature of the gas within the envelope of the balloon may in turn be accomplished by controlling the amount of solar energy that is absorbed by the gas within the balloon envelope.

As one example, the absorptive/reflective properties of the surface of the balloon envelope may be adjusted, or varied, by providing a balloon with an envelope having a first portion of the envelope having a property different from a second portion of the envelope, with respect to reflecting or absorbing solar energy. The balloon may be rotated to position a desired portion of the balloon into position relative to the sun. Stored solar energy could also be used for rotating the balloon envelope into a desired position with respect to the sun. Thus, balloon altitude could be controlled by controlling the pressure differential between the inside and outside of the balloon, in combination with rotating the balloon to a desired position relative to the sun to control the temperature within the balloon envelope.

In addition, a plurality of negative pressure vessels could be used in connection with a larger vessel, such as a blimp. For example, a number of negative pressure vessels could be positioned within a larger vessel, similar to gas bags or bladders used in a zeppelin. In this manner, the combined upward buoyant force of the plurality of negative pressure vessels could be used to lift the larger vessel. Once the larger vessel attains a desired altitude, the altitude of the larger vessel could be controlled by controlling the pressure differentials for each of the negative pressure vessels within the larger vessel. Using such a larger vessel may be desirable when a larger or heavier payload is contemplated which could not be carried by a single negative pressure vessel. Each of the various negative pressure vessels described above could be used with the larger vessel, which could be a blimp.

2. Example Balloon Networks

The negative pressure vessels described herein could be used in a network of balloons. The network of balloons could include one or more negative pressure vessels, and also include one or more conventional balloons using a lighter-than-air gas. The balloons used in the network of balloons may be configured to communicate with one another via free-space optical links, and could additionally or alternatively be configured to communicate with one another via RF links. The network of balloons may collectively function as a mesh network for packet-data communications. Further, at least some of balloons may be configured for RF communications with ground-based stations via respective RF links.

The negative pressure vessels, either alone or as part of a network of balloons, may be deployed in the stratosphere. In a balloon network, the balloons may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Additionally, altitudes above 18 km are typically above the maximum flight level designated for commercial air traffic. Therefore, interference with commercial flights is not a concern when balloons are deployed between 18 km and 25 km.

When used in a balloon network, the negative pressure vessels may be configured to transmit an optical signal to other balloons via an optical link. For example, the balloons may use one or more high-power light-emitting diodes (LEDs) to transmit an optical signal or may include laser systems for free-space optical communications over optical links.

In a further aspect, negative pressure vessels may utilize one or more of various different RF air-interface protocols for communication with ground-based stations via respective RF links. Thus, the balloons used in the balloon network may be configured to communicate with ground-based stations using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, some or all of balloons in the balloon network could be configured to establish a communication link with space-based satellites in addition to, or as an alternative to, a ground-based communication link. In some embodiments, a balloon may communicate with a satellite via an optical link. However, other types of satellite communications are possible.

The payload of the balloon may include a processor and on-board data storage, such as memory which may take the form of or include a non-transitory computer-readable medium. The non-transitory computer-readable medium may have instructions stored thereon, which can be accessed and executed by the processor in order to carry out various balloon functions. The payload of the balloon may also include various other types of equipment and systems to provide a number of different functions. For example, the payload may include an optical communication system which may transmit optical signals via an ultra-bright LED system, and which may receive optical signals via an optical-communication receiver (e.g., a photodiode receiver system). Further, the payload may include an RF communication system which may transmit and/or receive RF communications via an antenna system.

The payload may also include a power supply to supply power to the various components of balloon and could include a rechargeable battery. In other embodiments, the power supply may additionally or alternatively represent other means known in the art for producing power. In addition, the balloon may include a solar power generation system. The solar power generation system may include solar panels and could be used to generate power that charges and/or is distributed by the power supply.

The payload may additionally include a positioning system. The positioning system could include, for example, a global positioning system (GPS), an inertial navigation system, and/or a star-tracking system. The positioning system may additionally or alternatively include various motion sensors (e.g., accelerometers, magnetometers, gyroscopes, and/or compasses). The positioning system may additionally or alternatively include one or more video and/or still cameras, and/or various sensors for capturing environmental data.

3. Providing a Negative Pressure Vessel where the Altitude May be Controlled by Controlling the Pressure Differential Between the Air Pressure within the Balloon Envelope and the Atmospheric Pressure Outside the Balloon Envelope As noted above, it may be desirable to provide for a vessel to be evacuated (or partially evacuated) of air, making the vessel lighter than the surrounding air and buoyant. Thus, it may be possible to create a vacuum, or partial vacuum, otherwise known as negative pressure within a balloon, by evacuating air from within the balloon envelope to obtain a balloon that is lighter than the surrounding air and that has a buoyant lifting force. In this manner, the altitude of a balloon may be controlled by changing the vacuum level within the balloon envelope, and thus changing the pressure differential between the air pressure within the balloon envelope and the surrounding air pressure.

As such, the structure of the balloon may be designed to withstand the forces resulting from the pressure differential between the low pressure inside of the balloon and the atmospheric pressure outside of the balloon. At the same time, the structure may be light enough so that the overall weight of the balloon and gas within is lighter than the surrounding air to provide a sufficient lifting force to control the altitude of the balloon.

Figure 2:
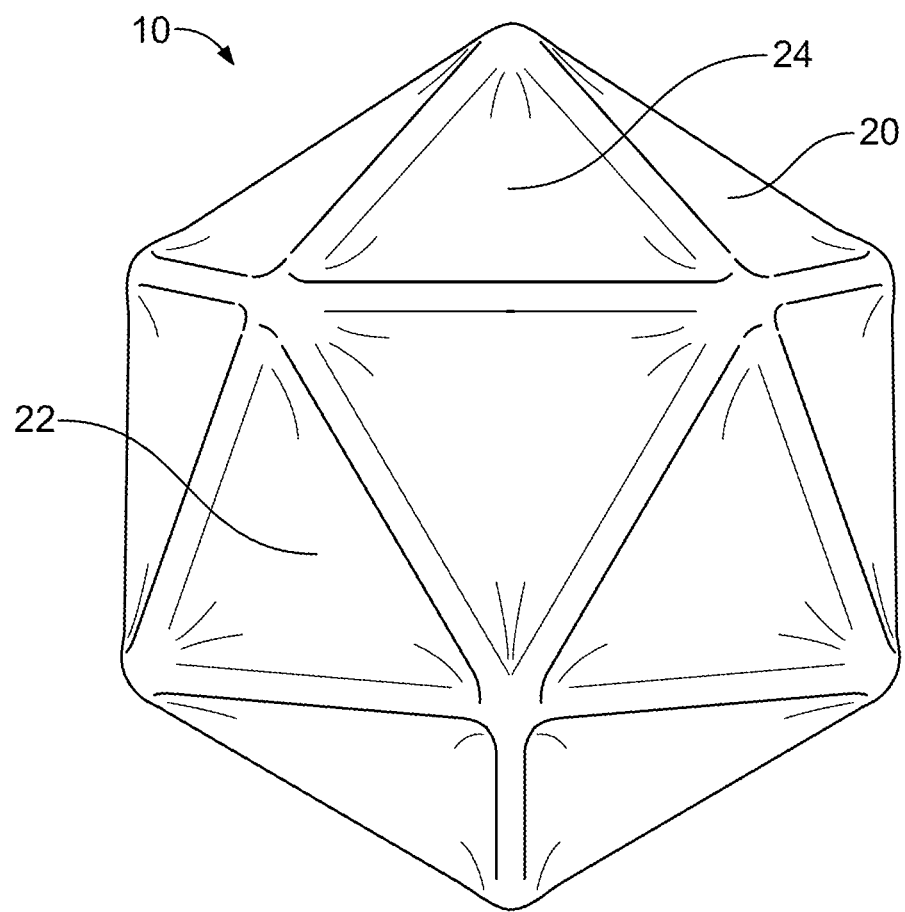
FIG. 2 shows a negative pressure vessel having the exostructure of FIG. 1 covered with a balloon envelope, according to an example embodiment.

As shown in FIGS. 1 and 2, a negative pressure vessel 10 may include a rigid internal structure or exostructure 17, which is covered by a balloon envelope or "skin" 24. To provide structural strength, the exostructure 17 may include light, but strong struts or rods, e.g., 12, 16a, 16b, and 16c having a tessellated geometry such as a geodesic dome, or the structure of a "Buckyball." Thus, the exostructure 17 may be essentially a rigid sphere formed of interconnected rods. The struts or rods may be connected together at each vertex using a connector 14. Other types of connectors may also be used to connect the ends of the struts or rods together, with the goal of reducing any stress concentrations in the exostructure. As shown in FIGS. 1 and 2, the exostructure 17 may include an icosahedron, or regular polyhedron with 20 identical equilateral triangular faces, with five faces meeting at each vertex where the connector 14 is positioned. Thus, a triangle or truss is formed by struts or rods 16a, 16b, and 16c. In this example, there are 20 equilateral triangles or trusses that make up the exostructure which may withstand the compressive forces that act thereon when a there is a pressure differential between the air pressure within the envelope and the atmospheric pressure outside the envelope. In a preferred embodiment, a second level tessellation is used.

The exostructure 17 may include a plurality of interlocking triangles to form an aggregation of trusses. As noted above, when the negative pressure vessel is evacuated, the exostructure will need to withstand substantial forces from the atmospheric pressure. As a result, the rods may take the form of struts or rods, e.g., 12, 16a, 16b, 16c, which are designed to withstand compressive forces and have stability against buckling under the pressure. The struts or rods may include or take the form of carbon fiber tubes that having sufficient dimensions in terms of length, and internal and external diameter, and Young's modulus to withstand the atmospheric pressure. The rods may be thick in terms of their external diameter on the order of a few centimeters, have a very thin wall with a thickness that is as thin as may be reliably manufactured, and have a short length on the order of ten centimeters.

Figure 4:
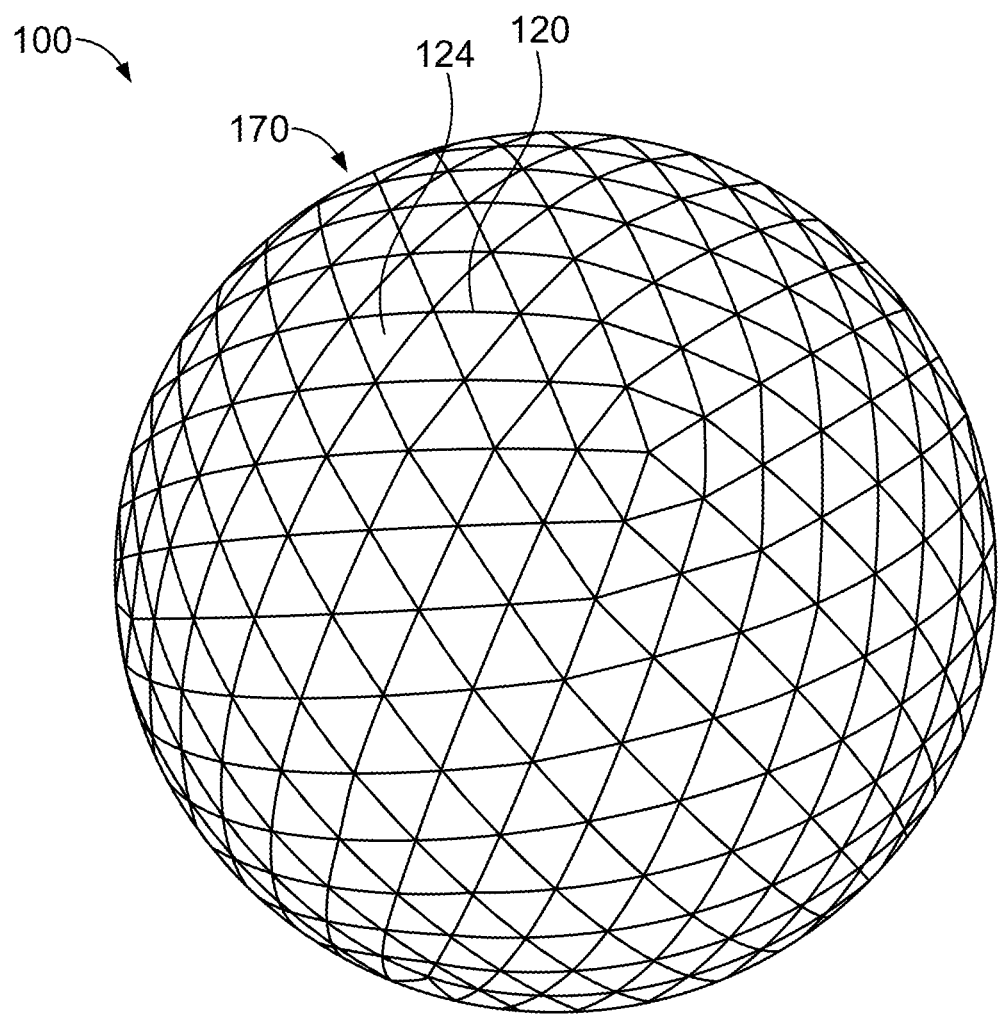
FIG. 4 shows an alternate tessellated exostructure of a negative pressure vessel, according to an example embodiment.
Figure 5:
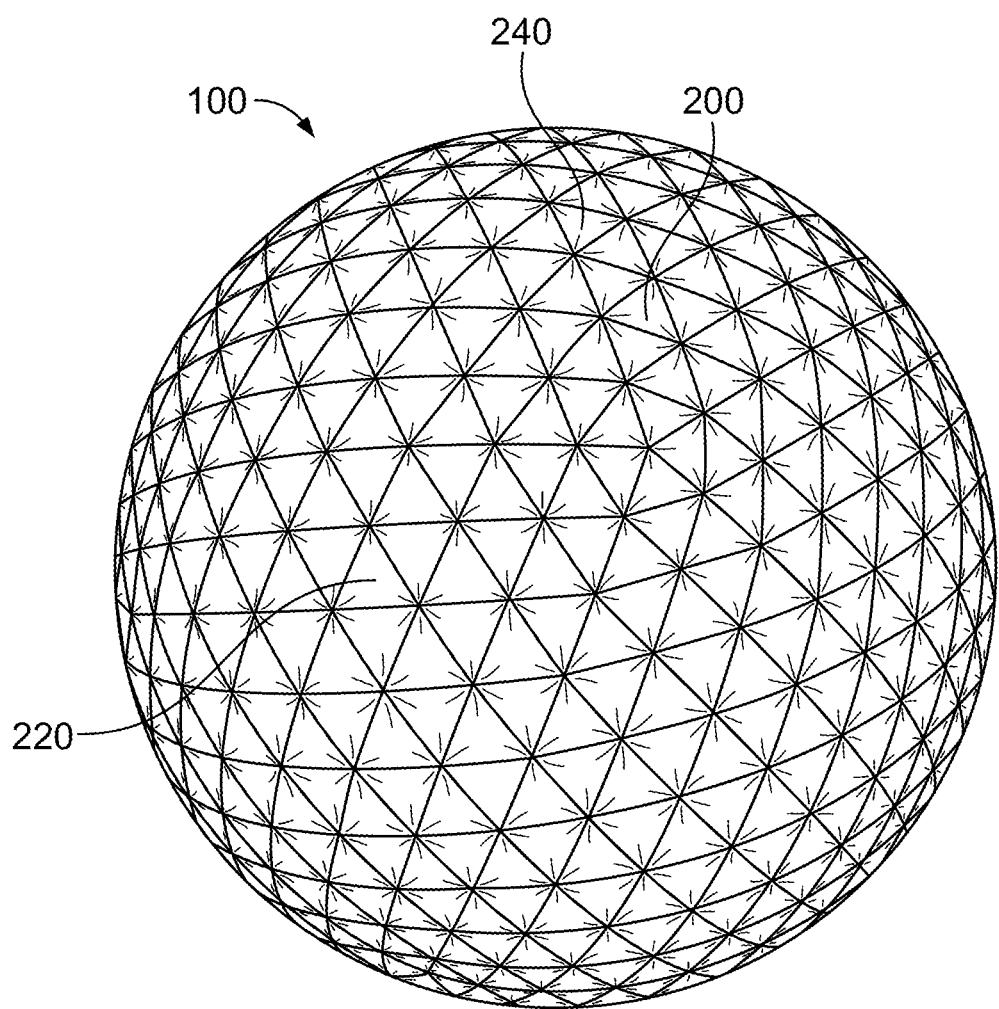
FIG. 5 shows a negative pressure vessel having the exostructure of FIG. 4 covered with a balloon envelope, according to an example embodiment.

FIGS. 4 and 5 disclose a negative pressure vessel 100 having an exostructure 170 that includes struts or rods 120 that are arranged to form a tessellated structure of triangles 124. The exostructure shown in FIGS. 4 and 5 is a multi-frequency icosahedron. The negative pressure vessel 100 includes an envelope 240 that covers the triangles (such as 200 and 220).

At sea level (and ground level) the negative pressure vessel will experience greater atmospheric pressure than when the vessel is operating at a desired altitude. As a result, in some applications it may be desirable to use a lighter-than-air gas with the negative pressure vessel to raise the negative pressure vessel to a desired altitude. As the altitude of the vessel increases, the lifting gas (such as helium) may be pumped out of the balloon envelope, or out of a bladder within the balloon envelope. Once the negative pressure vessel attains a desired altitude, the lifting gas may no longer be needed for purposes of altitude control.

Figure 3:
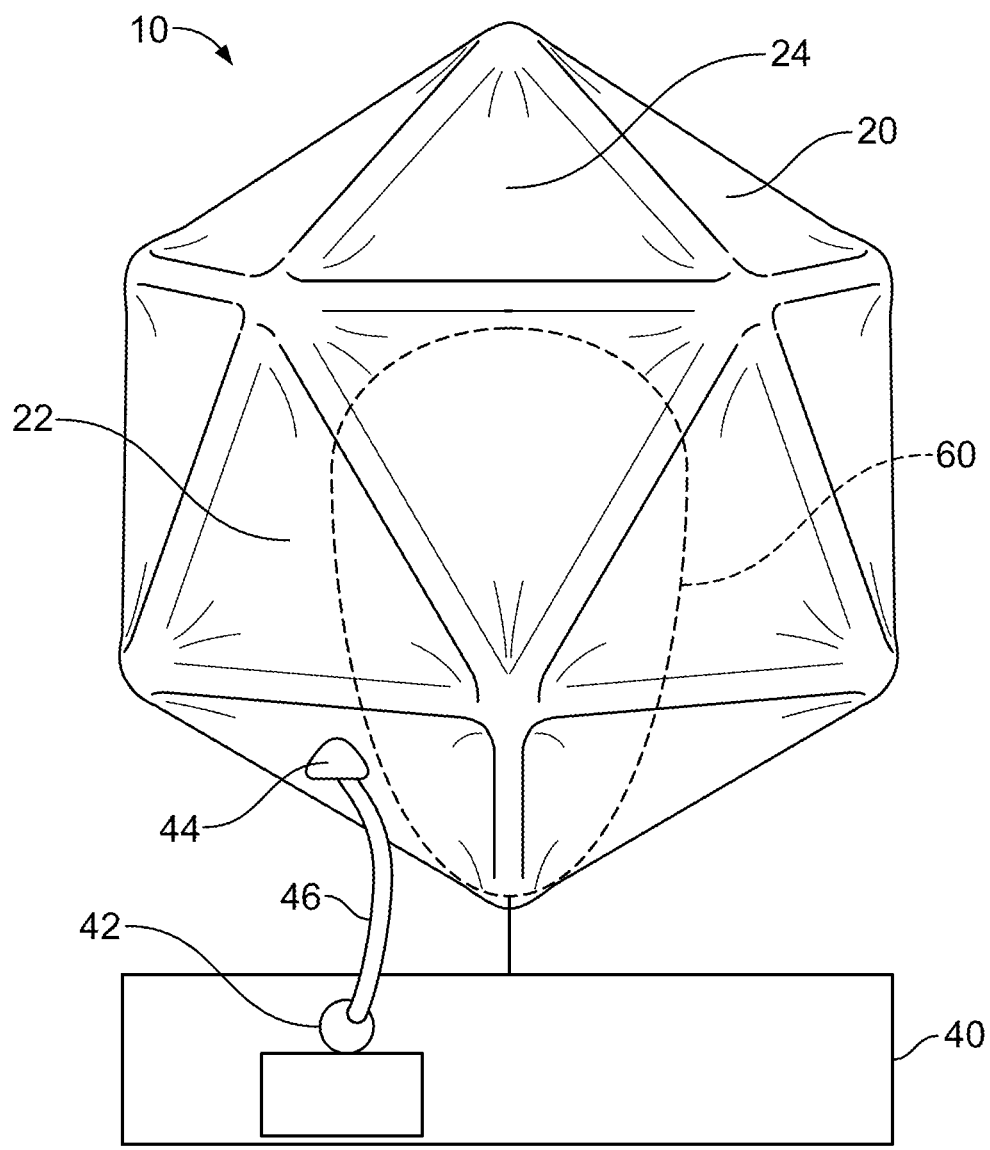
FIG. 3 shows the negative pressure vessel of FIG. 2 with a payload and a vacuum pump.

FIG. 3 shows the balloon 10 of FIG. 2 having an optional bladder 60 positioned within the balloon 10 which could be used to hold helium or other lifting gas if desired. Alternately, when a lifting gas such as helium is used, the entire balloon envelope could initially be filled with helium and used to bring the negative pressure vessel to a desired altitude. As the vessel ascends, the helium may be pumped out of the balloon envelope (or bladder 60) and eventually the helium will dissipate and the altitude of the balloon 10 may be controlled solely by varying the pressure differential between the pressure of gas within the balloon envelope and the atmospheric pressure outside the balloon envelope. Thus, lifting gas may be used at launch so that the negative pressure vessel does not have to withstand full atmospheric pressure at sea level.

A typical balloon may include an envelope that consists of a single contiguous material. However, when a single contiguous material used with a typical balloon envelope is stretched over a negative pressure vessel, stress concentrations may form at the intersections of the struts or rods used in the exostructure. Stretching a continuous piece of an envelope over the exostructure may place undue stress on the envelope as the negative pressure within the vessel tries to "suck" the portions of the envelope between the struts or rods toward the center of the exostructure, because there is not enough material to allow the envelope material to sag between the struts or rods of the exostructure. As a result, it is desirable to provide additional envelope material between each of the struts or rods.

Figure 6:
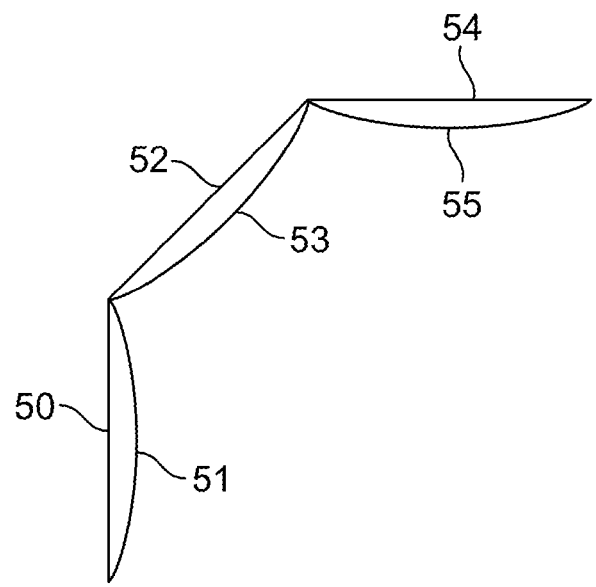
FIG. 6 shows a partial cross sectional view of the negative pressure vessel shown in FIG. 2.

As shown in FIG. 6, a partial cross-sectional view of the negative pressure vessel 10 is shown. Envelope material 51 is shown extending beneath strut 50, envelope material 53 is shown extending beneath strut 52, and envelope material 55 is shown extending beneath strut 54. Thus, additional envelope material is provided between the struts of the tessellated structure of the exostructure. In other words the surface area of the envelope material provided between each triangle of struts is greater than the area between those struts. As a result, the envelope material is able to sag between the struts towards the center of the exostructure resulting in reduced stress concentrations on the envelope and providing for greater envelope strength. In FIG. 6, the envelope material 51, 53, and 55 takes the shape of a catenary surface, in three dimensions, that advantageously provides even greater distribution of stress and force across the envelope. A catenary shaped surface is similar to, but different than, a parabolic surface (which could also be used), but provides a desired distribution of stress and force across the envelope. The desired catenary shaped surface of the envelope material between the struts or rods allows the envelope material to sag like a suspension bridge, as opposed to having the envelope material flat between the struts or rods of the exostructure.

Figure 7A:
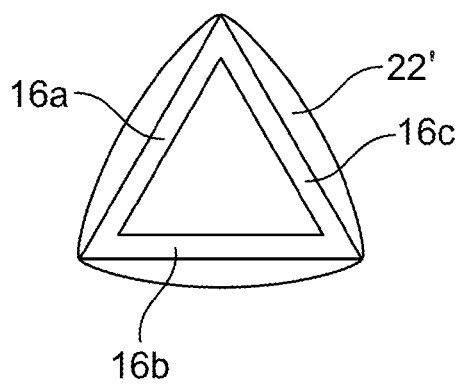
FIG. 7A shows a triangular section of the negative pressure vessel shown in FIG. 2 with balloon envelope material prior to attachment to the struts or rods of the triangular section.
Figure 7B:
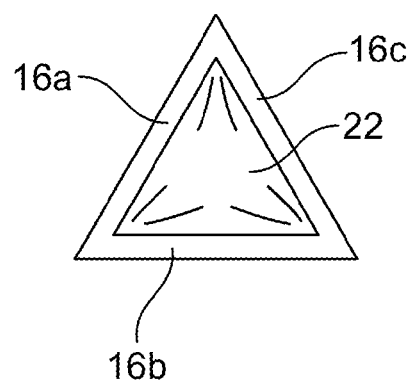
FIG. 7B shows the triangular section of the negative pressure vessel shown in FIG. 2 with balloon envelope material attached to a triangular section thereof.

As shown in FIGS. 7A and 7B, to form a catenary surface between the struts 16a, 16b, and 16c, an envelope material 22' in an amount greater in area than the triangle formed by struts 16a, 16b, and 16c may be used for each such triangle. The oversized material 22' is used to provide an envelope material 22 positioned in a desired sagging, catenary-shaped position between the triangle formed by struts 16a, 16b, and 16c, as well as the other triangles (or other tessellated structures that may be used) of the exostructure, where it may be joined to or connected to an adjacent piece of envelope material. The different portions of envelope material may be joined together in an essentially air-tight manner (to hold the vacuum) using conventional techniques. For example, if the envelope material is MYLAR™ a thermoplastic film, then the adjacent pieces of envelope material can be heat sealed together or a suitable adhesive may be used.

At a desired altitude, therefore, the altitude of the balloon 10 may be controlled by pumping air into or out of the balloon envelope to control the pressure differential between the air pressure within the balloon and the atmospheric pressure outside the balloon. Thus, if it is desired to increase the altitude of the balloon, more air may be pumped out of the balloon envelope to increase the pressure differential and provide a more buoyant upward force. Conversely, if it is desired to decrease the altitude of the balloon, air may be let into (or pumped into) the balloon envelope to decrease the pressure differential and provide a less buoyant upward force.

As shown in FIG. 3, the negative pressure vessel 10 may be equipped with a light weight vacuum pump 42 suitable to pump air out of the balloon envelope to increase the pressure differential. As noted above, light weight vacuum pump 42 may be a reciprocating vacuum pump. The pump 42 may be connected to a hose 46 that is in turn in communication with an aperture 44 located on the exterior of the negative pressure vessel 10. The pump 42 may be operated to pump air out of the balloon envelope as desired to control the altitude of the negative pressure vessel 10. A valve could also be operated to allow air to bleed into the balloon envelope to decrease the pressure differential and allow the balloon to descend. Alternately, the pump 42 could be used to pump air into, or out of, the balloon envelope as desired.

Figure 8:
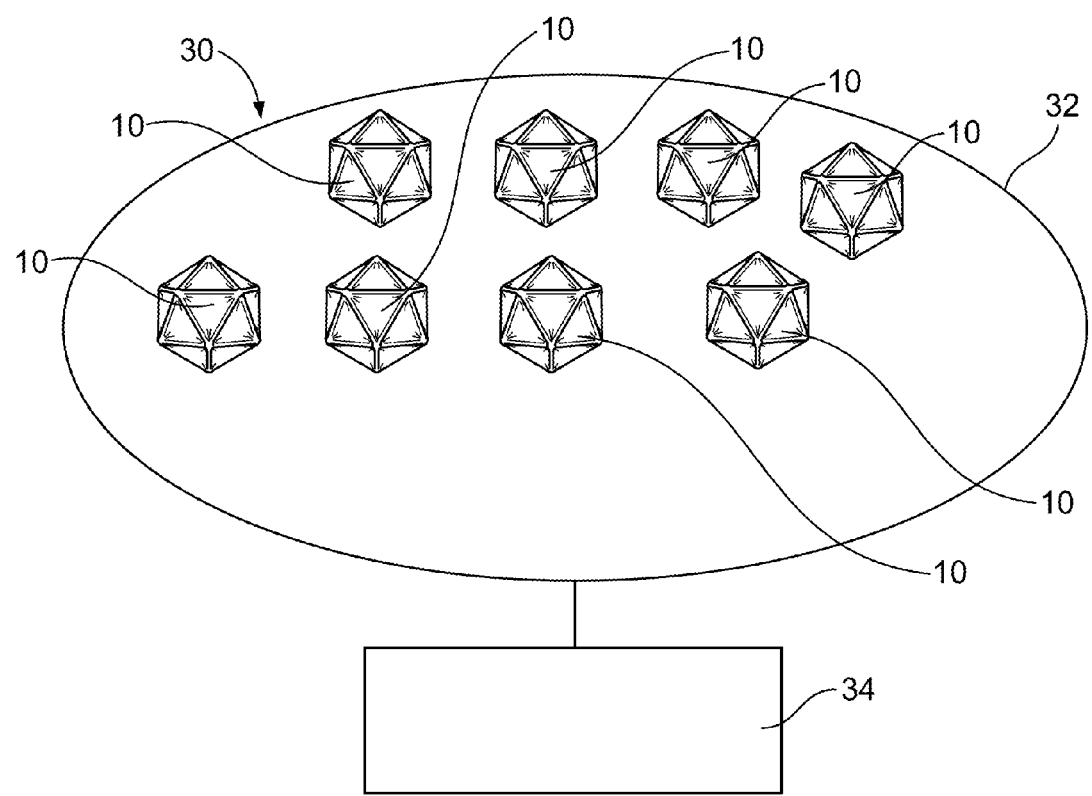
FIG. 8 shows a blimp with a plurality of negative pressure vessels of the type shown in FIG. 2 positioned therein.

4. Providing a Vessel Having a Plurality of Negative Pressure Vessels within, and Controlling the Altitude of the Vessel by Controlling the Pressure Differential of the Negative Pressure Vessels Furthermore, as shown in FIG. 8, a vessel 32, such as a blimp may be used where a plurality of negative pressure vessels 10 could be used in connection such a larger vessel, such as a blimp. For example, a number of negative pressure vessels 10 could be positioned within a vessel envelope 32, similar to gas bags or bladders used in a zeppelin. In this manner, the combined upward buoyant force of the plurality of negative pressure vessels 10 could be used to lift the larger vessel 30. Once the larger vessel 30 attains a desired altitude, the altitude of the larger vessel 30 could be controlled by controlling the pressure differentials for each of the negative pressure vessels 10 within the larger vessel 30. Using such a larger vessel may be desirable when a larger or heavier payload 34 is contemplated which could not be carried by a single negative pressure vessel 10. Each of the various negative pressure vessels 10 described above could be used with the larger vessel 30, which could be a blimp.

Figure 9:
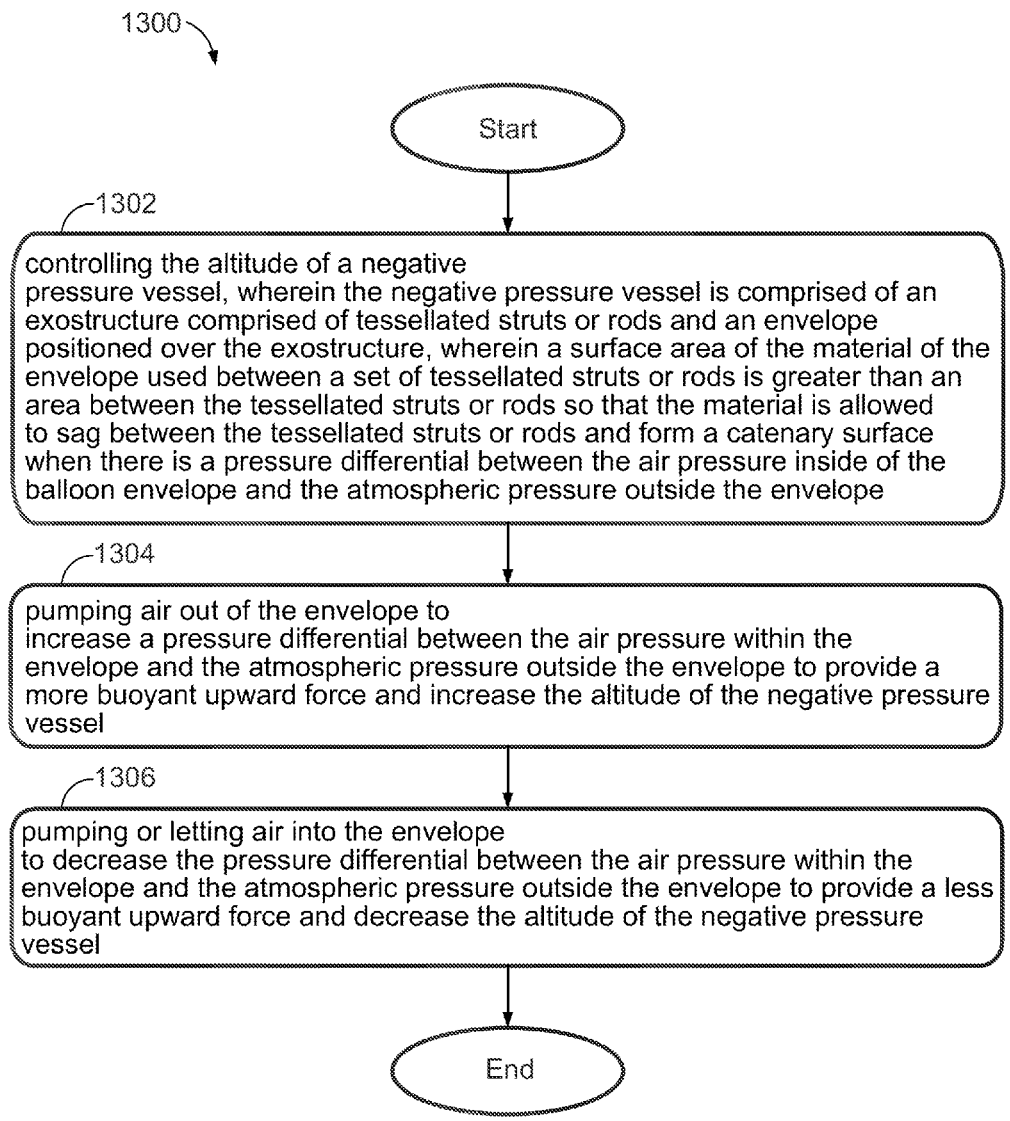
FIG. 9 is a method, according to an example embodiment.

FIG. 9 shows a method 1300 that is provided that includes the step 1302 of controlling the altitude of a negative pressure vessel, where the negative pressure vessel includes an exostructure made of tessellated struts or rods and an envelope positioned over the exostructure, where a surface area of the material of the envelope used between a set of tessellated struts or rods is greater than an area between the tessellated struts or rods so that the material is allowed to sag between the tessellated struts or rods and forms a catenary surface when there is a pressure differential between the air pressure inside of the balloon envelope and the atmospheric pressure outside the envelope. The method 1300 further includes the step 1304 of pumping air out of the envelope to increase a pressure differential between the air pressure within the envelope and the atmospheric pressure outside the envelope to provide a more buoyant upward force and increase the altitude of the negative pressure vessel. The method 1300 further includes the step 1306 of pumping or letting air into the envelope to decrease the pressure differential between the air pressure within the envelope and the atmospheric pressure outside the envelope to provide a less buoyant upward force and decrease the altitude of the negative pressure vessel.

5. A Non-Transitory Computer Readable Medium with Instructions to Control the Pressure Differential Between the Air Pressure Inside a Balloon Envelope and the Atmospheric Pressure to Control the Altitude of a Negative Pressure Vessel.

Some or all of the functions described above and illustrated in FIGS. 1-9 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as a processor. Alternatively, the computing device that executes the stored instructions could be another computing device, such as a server in a server network, or a ground-based station.

The non-transitory computer readable medium may store instructions executable by the processor to perform various functions. The functions could include the controlling the altitude of a balloon, and pumping air out of the balloon to increase the altitude of the balloon, and pumping or letting air into the balloon to decrease the altitude of the balloon.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
   an exostructure comprised of hollow struts or rods;
   an envelope material positioned over the exostructure;
   a pump for pumping air out of the balloon to create an air pressure differential between the pressure inside the envelope and atmospheric pressure outside the envelope;
   a control system configured to:
   allow air to flow into the envelope to control the altitude of the balloon; and operate the pump to pump air out of the envelope to control the altitude of the balloon;
   wherein the exostructure is comprised of triangles formed by the hollow struts or rods; and
   wherein the envelope material is comprised of a plurality of sections; where each section is sized in an amount greater in size than the triangles and is positioned over a triangle, where the sections of the envelope material have a generally rounded shape that is used to extend between the struts or rods of a triangle such that each section of the envelope material is arranged so as to sag between the struts or rods of a triangle before attachment to an adjacent section, and before a vacuum is applied.

2. The balloon of claim 1, wherein the exostructure is comprised of equilateral triangles formed by the hollow struts or rods.

3. The balloon of claim 1, wherein the hollow struts or rods are comprised of thin-walled carbon fiber tubes having an outer diameter of 2-3 centimeters.

4. The balloon of claim 3, wherein the hollow struts or rods are on the order of 10 centimeters+/−50 percent in length.

5. The balloon of claim 1, wherein the envelope material is comprised of thermoplastic film.

6. The balloon of claim 1, wherein after the envelope material has been placed over the hollow struts or rods, the envelope material has been stretched prior to being finally attached to the exostructure.

7. The balloon of claim 6, wherein after the envelope material has been placed over the hollow struts or rods, the envelope material has been heated prior to being finally attached to the exostructure.

8. The balloon of claim 1, further including a bladder that may contain a lighter-than-air gas to provide additional buoyant force to the balloon.

9. A vessel comprising:
   a plurality of balloons attached to or positioned within the vessel, wherein the plurality of balloons are each comprised of:
   an exostructure comprised of hollow struts or rods;
   an envelope positioned over the exostructure;
   a pump for pumping air out of the balloon to create an air pressure differential between the pressure inside the envelope and the atmospheric pressure outside the envelope;
   a control system configured to:
   allow air to flow into the envelope to control the altitude of the balloon; and operate the pump to pump air out of the envelope to control the altitude of the balloon;
   wherein the exostructure is comprised of triangles formed by the hollow struts or rods;
   wherein the envelope material is comprised of a plurality of sections; where each section is sized in an amount greater in size than the triangles and is positioned over a triangle, where the sections of the envelope material have a generally rounded shape that is used to extend between the struts or rods of a triangle such that each section of the envelope material is arranged so as to sag between the struts or rods of a triangle before attachment to an adjacent section, and before a vacuum is applied; and
   wherein air may be pumped out of the balloon envelope, or introduced into the balloon envelope, to control the altitude of the vessel.

10. The vessel of claim 9, where the exostructure is comprised of equilateral triangles formed by the hollow struts or rods.

11. The vessel of claim 9, wherein the hollow struts or rods are comprised of thin-walled carbon fiber tubes having an outer diameter of 2-3 centimeters.

12. The vessel of claim 9, wherein the plurality of balloons have an envelope material comprised of thermoplastic film.

13. A method, comprising:
   providing a balloon having an exostructure comprised of hollow struts or rods, an envelope material positioned over the exostructure, a pump for pumping air out of the balloon to create an air pressure differential between the pressure inside the envelope and atmospheric pressure outside the envelope, a control system configured to allow air to flow into the envelope to control the altitude of the balloon, and operate the pump to pump air out of the envelope to control the altitude of the balloon, wherein the exostructure is comprised of triangles formed by the hollow struts or rods; and
   wherein the envelope material is comprised of a plurality of sections; where each section is sized in an amount greater in size than the triangles and is positioned over a triangle, where the sections of the envelope material have a generally rounded shape that is used to extend between the struts or rods of a triangle such that each section of the envelope material is arranged so as to sag between the struts or rods of a triangle before attachment to an adjacent section, and before a vacuum is applied;
   controlling the altitude of the balloon by:;
   pumping air out of the envelope to increase an air pressure differential between the pressure within the envelope and the atmospheric pressure outside the envelope to provide a more buoyant upward force and increase the altitude of the balloon; and
   pumping or letting air into the envelope to decrease the air pressure differential between the pressure within the envelope and the atmospheric pressure outside the envelope to provide a less buoyant upward force and decrease the altitude of the balloon.

14. The method of claim 13, wherein the exostructure is comprised of equilateral triangles formed by the hollow struts or rods.

15. The method of claim 13, wherein the hollow struts or rods are comprised of thin-walled carbon fiber tubes having an outer diameter of 2-3 centimeters.

16. The method of claim 15, wherein the hollow struts or rods are on the order of 10 centimeters in length.

* * * * *